Jan. 15, 1952 N. C. POWLISON 2,582,277
PERSON ALERTING DEVICE
Filed Feb. 12, 1946
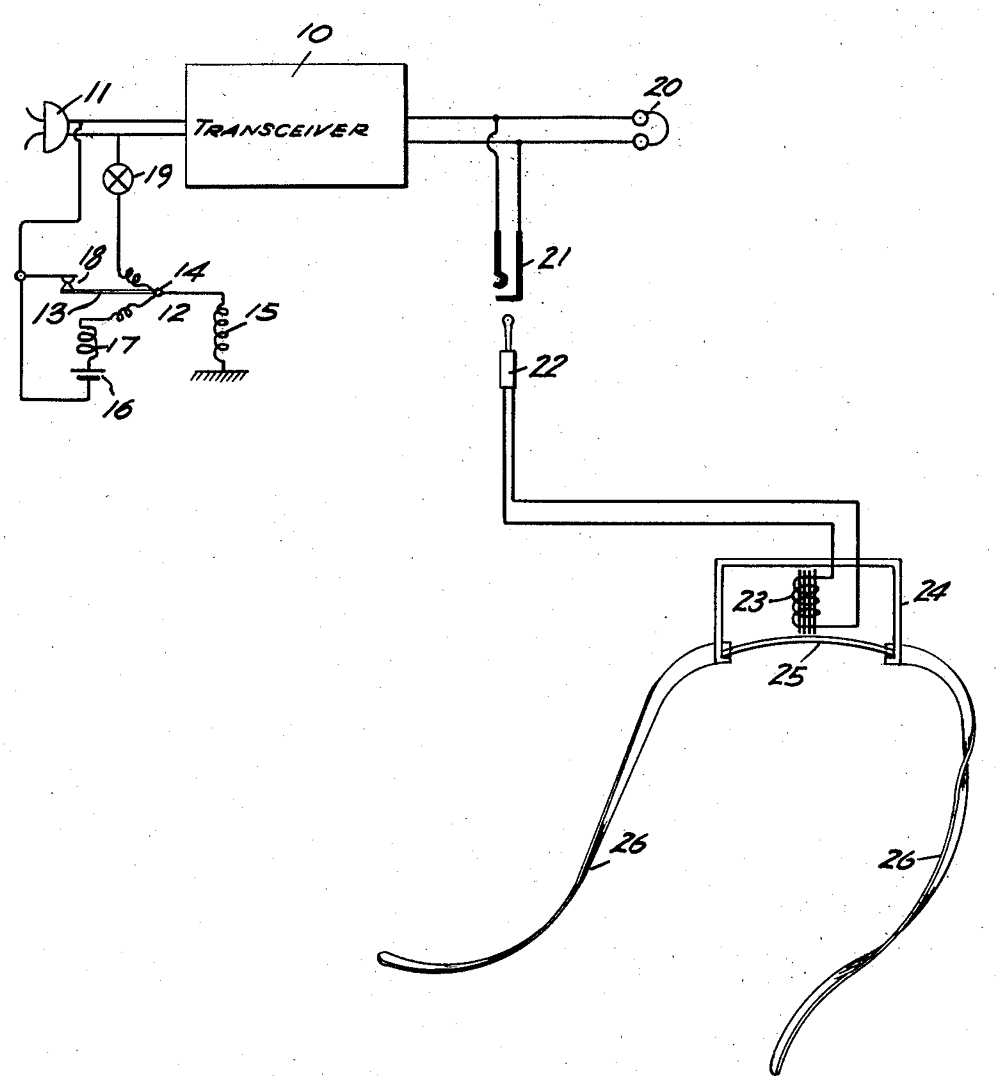
INVENTOR
NEIL C. POWLISON
BY William D. Hall
ATTORNEY Patented Jan. 15, 1952 2,582,277

UNITED STATES PATENT OFFICE 2,582,277

PERSON ALERTING DEVICE

Neil C. Powlison, United States Army,
Council Bluffs, Iowa

Application February 12, 1946, Serial No. 647,181

1 Claim. (Cl. 343—225)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to indicating devices and more particularly to devices at radio receivers for indicating to an attendant at the receiver when a radio station is transmitting, and particularly to attract attention of the operator of the receiver when the sending station is about to send information signals.

In modern military operations it is customary to give orders to men at some distance by use of a small transceiver manually carried by a soldier, or a receiver otherwise set up. However, the operator must often lay aside the instrument, so that he would not hear an ordinary message, and might fail to take such message if transmitted, and it is difficult to indicate to the receiving station when it is desired for the operator of that station to listen-in for the orders. It is an object of this invention to provide an indicator which will give the receiver operator notice that he should listen for a transmitted message, even if he does not hear signals coming through the receiver 'phone.

Briefly, the invention consists of suitable means associated with the transmitter and the receiver for giving the operator at the receiving station warning by mechanical movement of a device constantly in physical contact with his body. This eliminates the need for the operator to hold the receiving earphones adjacent the ear at all times and has the advantage that the hearing of the receiving operator is not impaired during such time he is not actually listening to the orders sent out from the transmitting station.

The drawing is a schematic diagram, partly structural, illustrating the principles of the operation of this invention and showing a head piece embodying the tactual device.

The invention consists essentially of a transceiver 10 which has a microphone 11 feeding the same. Shunted across the microphone is a buzzer 12 having an arm 13 pivoted at 14 and biased clock-wise by spring 15. The battery 16 may be part of the batteries associated with the transceiver 10 and is in series with the coil 17 of the buzzer 12. When the arm 13 is rotated clockwise it makes circuit at contact 18 and microphone 11 is shorted out. The battery 16 supplies current to coil 17 beneath the contact end of arm 13, thus rotating the arm 13 counterclockwise. Hence, the arm 13 will vibrate at a rapid rate, intermittently shorting the input to the transceiver 10 causing a modulated wave to be transmitted. The modulation is a low sonic frequency or tone of extreme amplitude, and in the output of the transceiver to the headphone corresponding severe alternations will occur capable of causing substantial mechanical movement of a large diaphragm. This modulated wave may be controlled by the key 19.

When it is desired to transmit to the receiving station from the distant transmitting station, the transmitting station operator depresses his key 19 which sends the modulated tone by radio to the receiving station. This gives the receiving operator notice that voice transmission will follow.

Assuming that a similar device to transceiver 10 is found at the receiving station it will employ earphones 20 which normally would not be worn by the operator but would be placed adjacent his ear only after suitable warning had been received that transmission was to begin. In order that such warning may be carried out current from the receiver circuit is fed through the jack 21 and the plug 22 to the solenoid 23 of a warning device 24. The device 24 includes a diaphragm 25 which is held in place by straps 26 around the arm adjacent the wrist of the receiving operator. Therefore, the diaphragm 25 is adjacent the skin of the operator and will effect physical impulse, that is, vibrating pressures or blows against the arm of the wearer, when the modulated tone of buzzer such as 12 is received. This frequency will be sufficiently low for the separate oscillations to be clearly distinguished, and will impart a sharp physical shock to the wearer so that his attention is insured, even in the midst of battle conditions. In order that best results may be obtained the casing 24 is so arranged that the diaphragm 25 barely touches the skin.

In the use of the invention, it is unnecessary to have a switch cutout for the head phones or other listening device for sonic signal messages or voice-modulated signals; but the case assembly may be left upon the head and the plug 22 left inserted when messages other than the warning signal are being transmitted and received.

The device 23—25, however, by reason of the large size of the diaphragm and the impedance at 23, will not respond to ordinary voice frequencies effectively, and may not respond at all to the higher frequencies and lower amplitudes of the voice frequencies. Any response that may be manifest will be slight and will have little, if any, significance to the wearer. Neither will the shunt effect materially impair energizing of the head phones by sonic frequencies used in transmitting messages. In this way there need be no delay or complication in disconnecting and disposing of the warning device before receiving or transcribing a message. Where constant listening is maintained, the warning device may be disconnected and laid aside, although it may be worn in such a situation to serve as a means to assure that the operator is awake, for it will awaken an ordinary sleeper.

It will be observed in the drawing that the diaphragm 25 is an arcuate concave plate of substantial width as compared to the arm of a person, so that when the device is strapped on the arm, the arm will enter partly into the concavity without pressing severely thereagainst, and without necessarily touching the skin of the wearer, this enabling the use of the article as described by the impactive action which will best enable the wearer to distinguish the warning signal as a series of discrete diaphragm movements.

I claim to have invented:

A person-alerting device for the uses described comprising a U-shaped frame having the extremities of its arms spaced to butt against opposite sides of the arm of a person so that the frame may be arranged with its arms so butted against the arm of a person and with the bight portion of the frame spaced outwardly from and in a plane at right angles to such arm of a person, a magnetic diaphragm set between and extending across the space between the extremities of said arms of the frame and bowed inwardly toward the bight of said frame so as to approximate the segment of a cylinder positioned to lie with a concave side next to the skin of the arm of a person when such arm is positioned at the ends of said arms of said frame at right angles to the plane of the frame, an electromagnet mounted between the bight of the frame and said diaphragm with a polar part in magnetically effective spaced relation to the diaphragm so as to oscillate the latter under fluctuated energization of the magnet, releasable arm-encircling means connected with the ends of said arms of the frame constructed to engage around a person's arm presented against the ends of said arms of the frame, to secure the frame upon an arm of a person with the diaphragm in position to concuss a so-positioned arm under fluctuation of current in the magnet, and means to connect the magnet electrically across the output of a radio receiver.

NEIL C. POWLISON.

REFERENCES CITED

The following references are of record in the file of this patent:

UNITED STATES PATENTS

| Number | Name | Date |
|---|---|---|
| 793,004 | May | June 20, 1905 |
| 1,485,773 | Espenschied | Mar. 4, 1924 |
| 1,528,001 | Demarest et al. | Mar. 3, 1925 |
| 1,881,878 | Nidy | Oct. 11, 1932 |
| 1,918,458 | Dremel | July 18, 1933 |
| 1,941,533 | Bennett | Jan. 2, 1934 |
| 2,185,329 | Caldwell | Jan. 2, 1940 |
| 2,319,627 | Perlman | May 18, 1943 |